US012747719B2

(12) United States Patent
Couchman et al.

(10) Patent No.: US 12,747,719 B2
(45) Date of Patent: Sep. 29, 2026

(54) SYSTEM AND METHOD FOR CONTROLLING A WIND TURBINE BASED ON AN ESTIMATED ROTOR AZIMUTH

(71) Applicant: GE Infrastructure Technology LLC, Greenville, SC (US)

(72) Inventors: Ian Couchman, Horley (GB); Till Hoffmann, Osnabrueck (DE); Thomas Franklin Perley, Bluffton, SC (US)

(73) Assignee: GE Vernova Infrastructure Technology LLC, Greenville, SC (US)

( * ) Notice: Subject to any disclaimer, the term of this patent is extended or adjusted under 35 U.S.C. 154(b) by 0 days.

(21) Appl. No.: 18/899,345

(22) Filed: Sep. 27, 2024

(65) Prior Publication Data

US 2026/0092591 A1 Apr. 2, 2026

(51) Int. Cl.
*F03D 7/02* (2006.01)

(52) U.S. Cl.
CPC ...... *F03D 7/0204* (2013.01); *F05B 2270/327* (2013.01); *F05B 2270/329* (2013.01)

(58) Field of Classification Search
None
See application file for complete search history.

(56) References Cited

U.S. PATENT DOCUMENTS 8,092,174 B2 1/2012 Egedal
10,436,181 B2 10/2019 Slack et al.

FOREIGN PATENT DOCUMENTS

EP 2 317 132 A2 5/2011
WO WO2007/104585 A1 9/2007
WO WO2022/228630 A1 11/2022
WO WO 2023/088417 A1 5/2023

OTHER PUBLICATIONS

"On the Intrinsic Relationship Between the Least Mean Square and Kalman Filters" Danilo et al. Oct. 13, 2015 (Year: 2015).*
Plaza et al., Triaxial Accelerometer Based Azimuth Estimator for Horizontal Axis Wind Turbines, Journal of Wind Engineering & Industrial Aerodynamics, vol. 240, 2023, 105-463.
EPO Search Report, Feb. 10, 2026.

* cited by examiner

*Primary Examiner* — Kayla Mccaffrey
(74) *Attorney, Agent, or Firm* — Dority & Manning, P.A.

(57) ABSTRACT

A method for controlling a wind turbine includes receiving, via a control system, at least one speed condition of a drivetrain of the wind turbine from a first sensor. The method also includes receiving, via the control system, a pulse from a second sensor mounted within a nacelle of the wind turbine, the pulse being generated when the drivetrain shifts to a known angle. The method also includes estimating, via the control system, an azimuth of a designated rotor blade based on a combination of the at least one speed condition of the drivetrain and the pulse. The method also includes implementing, via the control system, a control action for the wind turbine based on the estimated azimuth.

10 Claims, 6 Drawing Sheets

SYSTEM AND METHOD FOR CONTROLLING A WIND TURBINE BASED ON AN ESTIMATED ROTOR AZIMUTH

FIELD

The present disclosure generally relates to wind turbines and, more particularly, to a system and method for controlling a wind turbine based on an estimation of a wind turbine rotor azimuth.

BACKGROUND

Wind power is considered one of the cleanest, most environmentally friendly energy sources presently available, and wind turbines have gained increased attention in this regard. A modern wind turbine typically includes a tower, a nacelle mounted atop the tower, a rotor mounted to the nacelle having one or more rotor blades, and a drivetrain within the nacelle. The drivetrain typically includes various drivetrain components, such as a generator and a gearbox. Further, the drivetrain can contain one or more friction connections, e.g., couplings or shrink fits in either the high-speed shaft (HSS) section or the low-speed shaft (LSS) section. The nacelle includes a rotor assembly coupled to the gearbox and to the generator. In many wind turbines, the generator and the gearbox are mounted to a bedplate within the nacelle via one or more torque arms. As such, the one or more rotor blades capture kinetic energy of wind using known airfoil principles. The rotor blades transmit the kinetic energy in the form of rotational energy so as to turn a shaft coupling the rotor blades to the gearbox, or if the gearbox is not used, directly to the generator. The generator then converts the mechanical energy to electrical energy that may be deployed to a utility grid.

Oftentimes, the wind turbine may be equipped with various sensors for determining an azimuth of the rotor blades. For example, certain wind turbines are equipped with a proximity sensor fixed to the gearbox and one or more reset plates (also referred to as detection plates) at known azimuth angles on the low-speed output of the gearbox. As the drive train rotates, the reset plates pass the proximity sensor and a positive reading is sent to the controller.

During installation and/or service of the wind turbine, the reset plates are located at known rotor azimuth locations. For example, one may be located to be inline with the proximity sensor when a designated rotor blade is pointing straight upwards. Information from this sensor then provides the turbine with knowledge of the azimuth one or more times per rotation.

One of the challenges associated with this approach is that the calculations associated with the implementation of reset plates are prone to error either by being placed too far away from the designated rotor blade (e.g., greater that 15 degrees) or by being aligned with the wrong blade (e.g., a second or third rotor blade). This misaligned reset plate can cause the azimuth to no longer be accurate. As such, control systems that rely on the azimuth, such as pitch systems, may not be operated in an optimal manner.

As such, the present disclosure is directed to improved systems and methods of estimating the azimuth of a wind turbine that address the aforementioned issues.

BRIEF DESCRIPTION

Aspects and advantages of the invention will be set forth in part in the following description, which may be obvious from the description or may be learned through practice of the invention.

In one aspect, a method for controlling a wind turbine is provided. The method includes receiving, via a control system, at least one speed condition of a drivetrain of the wind turbine from a first sensor. The method also includes receiving, via the control system, a pulse from a second sensor mounted within a nacelle of the wind turbine, the pulse being generated when the drivetrain shifts to a known angle. The method also includes estimating, via the control system, an azimuth of a designated rotor blade based on a combination of the at least one speed condition of the drivetrain and the pulse. The method also includes implementing, via the control system, a control action for the wind turbine based on the estimated azimuth.

In an embodiment, estimating the azimuth of the designated rotor blade based on the combination of the at least one speed condition of the drivetrain and the pulse further includes snapping the azimuth to the known angle when the pulse is passed.

In an embodiment, the at least one speed condition of the drivetrain includes at least one of a generator speed or a rotor speed of the wind turbine.

In an embodiment, estimating the azimuth of the designated rotor blade based on the combination of the at least one speed condition of the drivetrain and the pulse further includes integrating the at least one speed condition of the drivetrain with respect to time or passing the at least one speed condition of the drivetrain and the pulse through a Kalman filter.

In an embodiment, the second sensor is mounted with a reset plate that is secured to the drivetrain.

In an embodiment, the method further includes directly aligning the reset plate with the designated rotor blade.

In an embodiment, the method further includes aligning the reset plate with the designated rotor blade by a fixed offset.

In an embodiment, the method further includes determining the fixed offset via one or more accelerometers mounted in a rotatable hub of the wind turbine.

In an embodiment, the method further includes correcting measurements from the one or more accelerometers mounted in the rotatable hub via one or more rate gyroscopes.

In an embodiment, the second sensor includes a plurality of second sensors and the pulse includes a plurality of pulses and the method further includes identifying each second sensor of the plurality of second sensors using at least one acceleration condition of a rotatable hub or the nacelle of the wind turbine; and snapping the azimuth to the known angle when each of the plurality of pulses is passed from the plurality of second sensors.

In an embodiment, the method further includes correcting for an influence of tower side-to-side motions on the drivetrain via one or more accelerometers mounted in the nacelle of the wind turbine, the one or more accelerometers not rotating with a main shaft of the wind turbine.

In an embodiment, the control action is implemented via at least one of the drivetrain or a pitch adjustment mechanism, wherein the control action includes at least adjusting a rating of the wind turbine or pitching at least one rotor blade of the wind turbine.

In another aspect, a system for controlling a wind turbine is provided. The system includes a first sensor communicatively coupled to a drivetrain of the wind turbine. The system also includes a second sensor mounted within a nacelle of the wind turbine. The system also includes a control system configured to receive at least one speed condition of the drivetrain from the first sensor; receive a pulse from the second sensor, the pulse being generated when the drivetrain shifts to a known angle; estimate an azimuth of a designated rotor blade based on a combination of the at least one speed condition of the drivetrain and the pulse; and implement, via the control system, a control action for the wind turbine based on the estimated azimuth.

In another aspect, another method for controlling a wind turbine is provided. The method includes receiving, via a control system, at least one speed condition of a drivetrain of the wind turbine from a first sensor. The method also includes receiving, via the control system, a pulse from a second sensor mounted within a nacelle of the wind turbine, the pulse being generated when the drivetrain shifts to a known angle. The method also includes receiving, via the control system, at least one acceleration condition of a rotatable hub or the nacelle of the wind turbine from a third sensor. The method also includes estimating, via the control system, an azimuth of a designated rotor blade based on a combination of the at least one speed condition of the drivetrain, the pulse, and the at least one acceleration condition of the rotatable hub or the nacelle. The method also includes implementing, via the control system, a control action for the wind turbine based on the estimated azimuth.

These and other features, aspects, and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
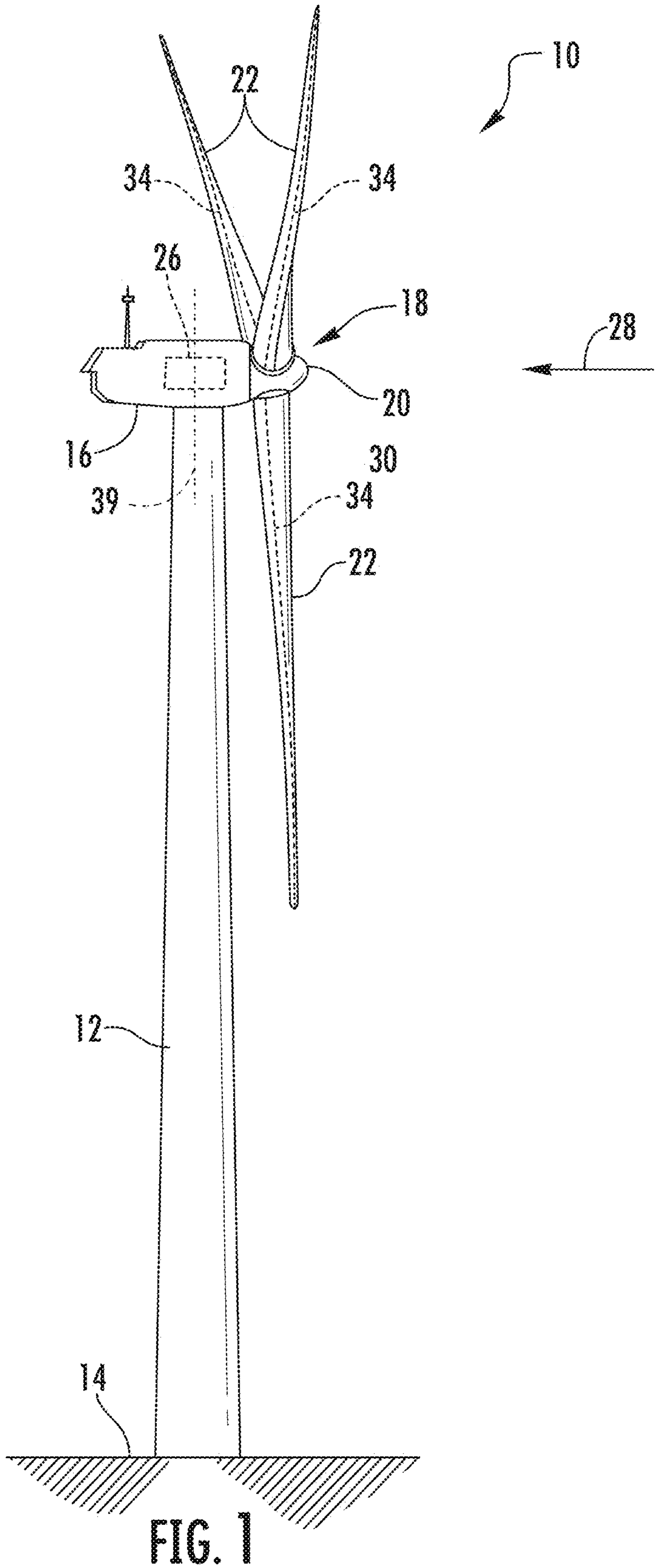
FIG. 1 illustrates a perspective view of an embodiment of a wind turbine according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of an embodiment can be used with another embodiment to yield a still further embodiment. Thus, it is intended that the present invention covers such modifications and variations as come within the scope of the appended claims and their equivalents.

Generally, the present disclosure is directed to systems and methods for controlling a wind turbine. In particular, the present disclosure is directed to systems and methods for controlling a wind turbine by estimating an azimuth of one or more rotor blades and implementing a control action for the wind turbine when the azimuth varies from an expected azimuth beyond a predetermined threshold.

For example, systems and methods of the present disclosure include receiving at least one speed condition of a drivetrain of the wind turbine and receiving a pulse from a sensor mounted within a nacelle of the wind turbine. The method further includes estimating an azimuth of the rotor blade based on a combination of the speed condition(s) of the drivetrain and the pulse. Furthermore, the method includes implementing a control action based on the estimated azimuth.

Accordingly, systems and methods of the present disclosure may provide an improved framework for controlling a wind turbine by estimated an azimuth having greater accuracy than previously achievable. In particular, systems and methods of the present disclosure may provide an estimate of an azimuth that has a reduced dependence on the accurate placement of reset plates or sensors. Further, due to having greater accuracy in the estimate of the azimuth, the location of the rotor blades of a wind turbine may be known with more accuracy. As such, control actions implemented by the wind turbine may be better able to improve the functioning of the wind turbine. Thus, the systems and methods of the present disclosure are capable of enabling improved operation of the wind turbine.

Referring now to the drawings, FIG. 1 illustrates a perspective view of an embodiment of a wind turbine 10 according to the present disclosure. As shown, the wind turbine 10 includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

Figure 2:
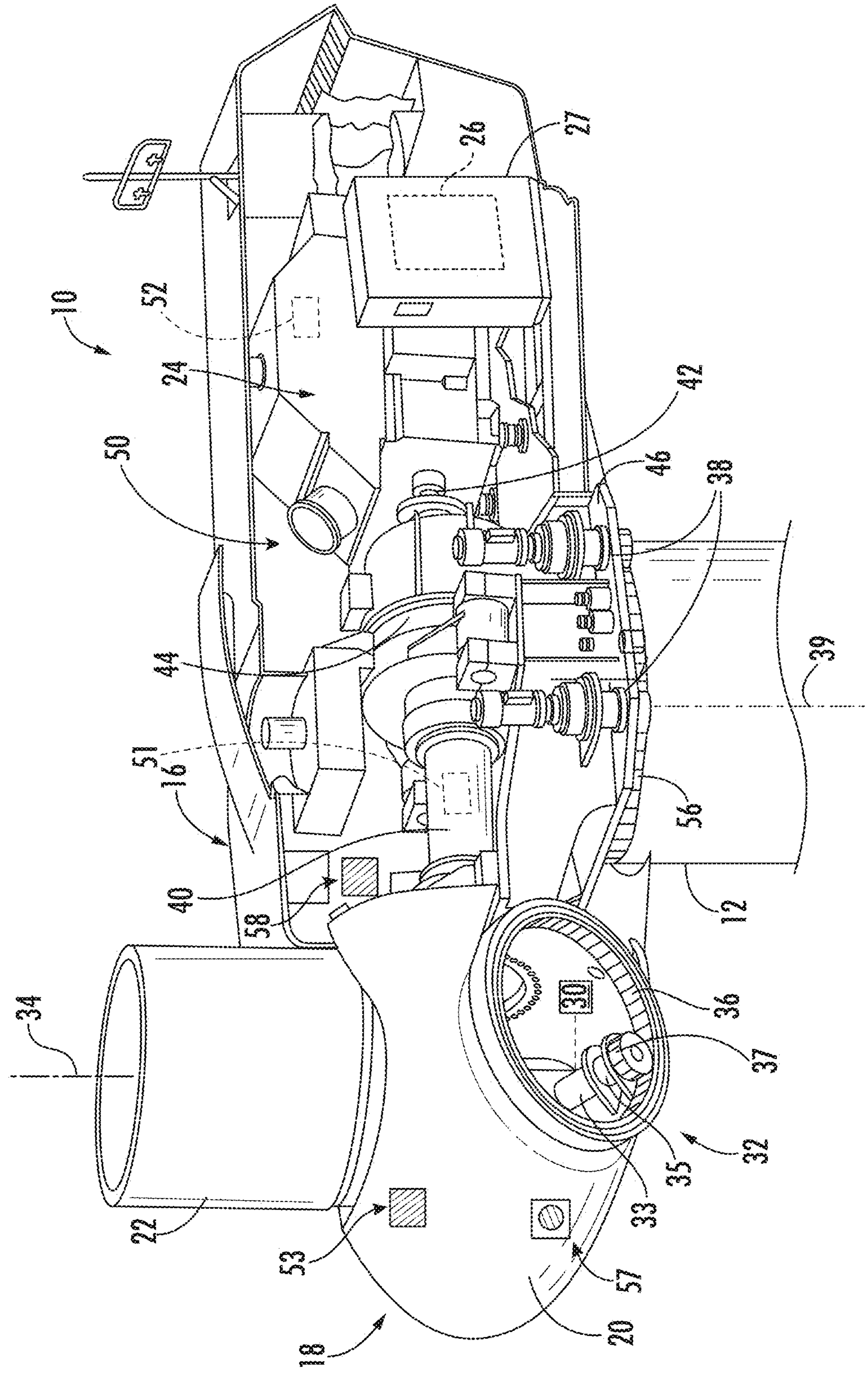
FIG. 2 illustrates a simplified, internal view of an embodiment of a nacelle of a wind turbine according to the present disclosure.

Referring now to FIG. 2, a simplified, internal view of an embodiment of the nacelle 16 of the wind turbine 10 is illustrated. As shown, the wind turbine 10 includes a generator 24 disposed within the nacelle 16. In general, the generator 24 may be coupled to the rotor 18 of the wind turbine 10 for generating electrical power from the rotational energy generated by the rotor 18. For example, the rotor 18 may include a main shaft or rotor shaft 40 coupled to the rotatable hub 20 for rotation therewith. The generator 24 may then be coupled to the rotor shaft 40 such that rotation of the rotor shaft 40 drives the generator 24. For instance, in the illustrated embodiment, the generator 24 includes a generator shaft 42 rotatably coupled to the rotor shaft 40 through a gearbox 44. However, in other embodiments, it should be appreciated that the generator shaft 42 may be rotatably coupled directly to the rotor shaft 40. Alternatively, the generator 24 may be directly rotatably coupled to the rotor shaft 40. Such components may be generally referred to herein as a drivetrain 50 or drivetrain assembly.

It should be appreciated that the rotor shaft 40 may generally be supported within the nacelle 16 by a support frame or bedplate 46 positioned atop the wind turbine tower 12. For example, the rotor shaft 40 may be supported by the bedplate 46 via a pair of pillow blocks mounted to the bedplate 46.

As shown in FIGS. 1 and 2, the wind turbine 10 may also include a turbine control system or a control system 26 within the nacelle 16. For example, as shown in FIG. 2, the control system 26 is disposed within a control cabinet 27 mounted to a portion of the nacelle 16. However, it should be appreciated that the control system 26 may be disposed at any location on or in the wind turbine 10, at any location on the support surface 14 (FIG. 1), or, generally, at any other location. The control system 26 may generally be configured to control the various operating modes (e.g., start-up or shut-down sequences) and/or components of the wind turbine 10.

As shown in FIG. 2, the wind turbine 10 may further include at least one pitch adjustment mechanism 32 for each of the rotor blades 22 that is configured to rotate each rotor blade 22 about its pitch axis 34. In an embodiment, each pitch adjustment mechanism 32 may include a pitch drive motor 33 (e.g., any suitable electric, hydraulic, or pneumatic motor), a pitch drive gearbox 35, and a pitch drive pinion 37. In such embodiments, the pitch drive motor 33 may be coupled to the pitch drive gearbox 35 so that the pitch drive motor 33 imparts mechanical force to the pitch drive gearbox 35. Similarly, the pitch drive gearbox 35 may be coupled to the pitch drive pinion 37 for rotation therewith. The pitch drive pinion 37 may, in turn, be in rotational engagement with a pitch bearing 36 coupled between the rotatable hub 20 and a corresponding rotor blade 22 such that rotation of the pitch drive pinion 37 causes rotation of the pitch bearing 36. Thus, in such embodiments, rotation of the pitch drive motor 33 drives the pitch drive gearbox 35 and the pitch drive pinion 37, thereby rotating the pitch bearing 36 and the rotor blade 22 about the pitch axis 34.

Similarly, the wind turbine 10 may include one or more yaw drive mechanisms 38 communicatively coupled to the control system 26, with each yaw drive mechanism(s) 38 being configured to change the angle of the nacelle 16 relative to the wind (e.g., by engaging a yaw bearing 56 of the wind turbine 10 and rotating the nacelle 16 about a yaw axis 39).

Further, as shown, the control system 26 may also be communicatively coupled to each pitch adjustment mechanism 32 of the wind turbine 10 through a separate or integral pitch controller 30 (FIG. 1) for controlling and/or altering the pitch angle of each respective rotor blade 22 (i.e., an angle that determines a perspective of the rotor blades 22 with respect to the direction 28 of the wind).

Figure 3A:
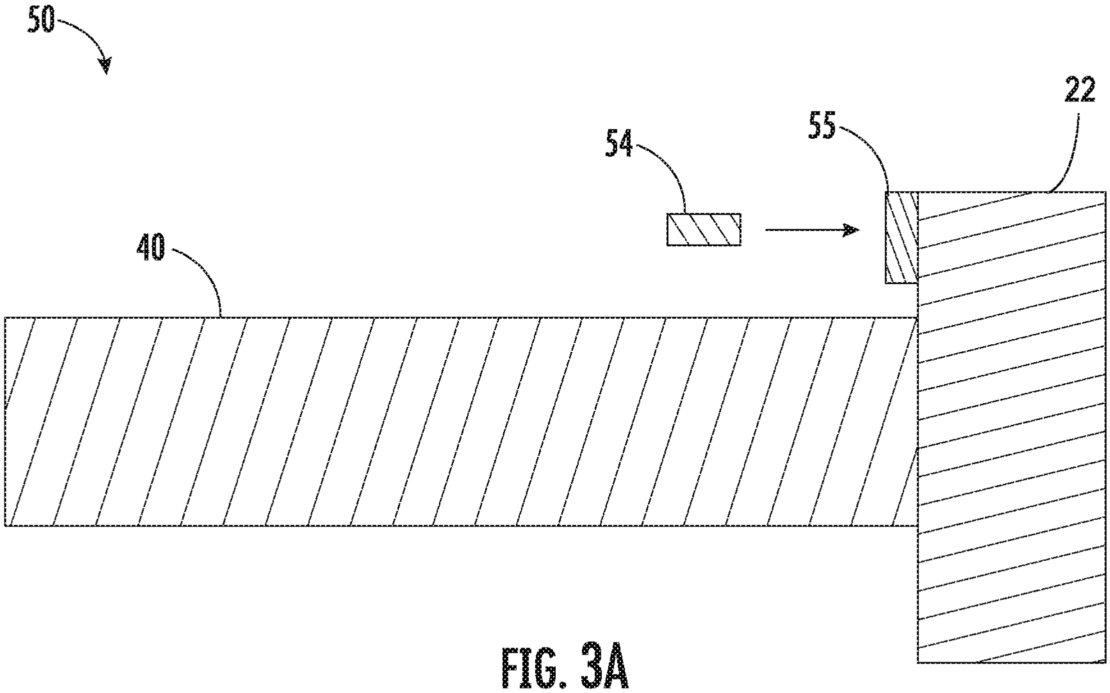
FIG. 3A illustrates a side view of an embodiment of a rotor shaft and gearbox of a wind turbine according to the present disclosure.
Figure 3B:
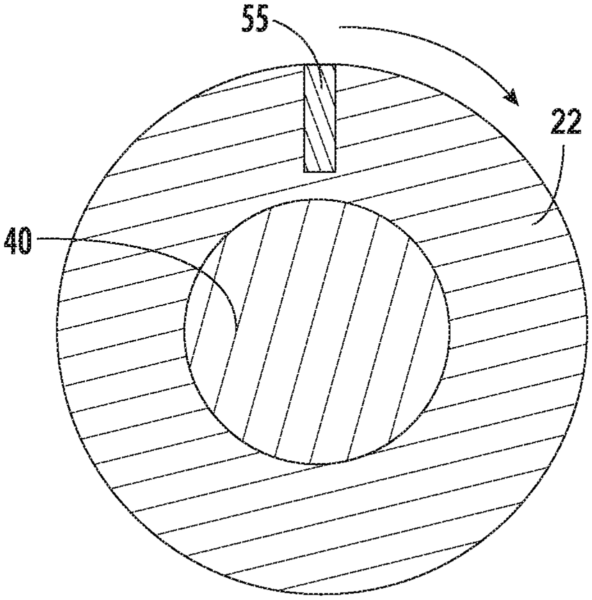
FIG. 3B illustrates a front view of an embodiment of a rotor shaft and gearbox of a wind turbine according to the present disclosure.

In addition, as shown in FIG. 2 and FIGS. 3A-3B, one or more sensors 51, 52, 53, 54, 57, 58 may be provided on the wind turbine 10. Each of these sensors 51, 52, 53, 54, 57, 58 may assist in monitoring conditions of the wind turbine 10 and may also further assist in estimating an azimuth of the wind turbine 10 as will be described in greater detail hereinbelow.

In certain embodiments, the sensors 51, 52, 53, 54, 57, 58 may be one or more accelerometer(s) mounted with the drivetrain 50, the rotatable hub 20, and within the nacelle 16 of the wind turbine 10. Further embodiments of sensors 51, 52, 53, 54, 57, 58 may include any other suitable type of sensor, such as wind vanes, anemometers, yaw sensors, pitch sensors, torque sensors, temperature sensors, vibration sensors, speed sensors, power output sensors, environmental sensors, pitch angle sensors, wind shear sensors, or similar. As such, the sensors 51, 52, 53, 54, 57, 58 may further be in communication with the control system 26 and may provide related information to the control system 26.

It should also be appreciated that, as used herein, the term "monitor" and variations thereof indicate that the various sensors of the wind turbine 10 may be configured to provide a direct measurement of the parameters being monitored and/or an indirect measurement of such parameters. Thus, the sensors described herein may, for example, be used to generate signals relating to the parameter being monitored, which can then be utilized by the control system 26 to determine the condition.

More specifically, as shown in FIG. 2, a shaft sensor 51 may be communicatively coupled with the rotor shaft 40 and/or the rotor 18 to monitor a speed thereof. In addition, as shown, a generator sensor 52 may be communicatively coupled with the generator 24 to monitor a speed thereof. In particular, the generator sensor 52 may be provided with the drivetrain 50 for detecting speed conditions (or other conditions directly related to speed) associated with the generator 24. Thus, it can be understood the sensors 51 and 52 can collectively or individually monitor a speed condition (or derivative thereof) relating to the drivetrain 50 of the wind turbine 10.

Additionally, a sensor 53 may also be provided on or within the rotatable hub 20 for detecting accelerations or forces exhibited by or exerted on the rotatable hub 20. Additionally, sensor 57 may also be mounted on or within the rotatable hub 20 to assist the sensor 53 in detecting accelerations of the rotatable hub 20. Specifically, the sensor 57 may be a rate gyroscope or a gyroscopic sensor that can be used to correct any errors in measurements observed from the sensor 53, i.e., the accelerometer mounted within the rotatable hub 20.

In addition, a sensor 58 may be provided with the nacelle 16 of the wind turbine 10 for measuring acceleration or forces associated with the nacelle 16. The sensor 58 may be mounted on or within the nacelle 16 to assist in observing an acceleration of the rotatable hub 20 that is not tied to the oscillation of the rotatable hub 20. For example, the sensor 58 may be able to detect the forces or accelerations exerted on the rotatable hub 20 that result in a side-to-side motion or acceleration of the rotatable hub 20. To achieve this, the sensor 58 may be fixed to the nacelle 16 and may not rotate with the rotor shaft 40 of the wind turbine 10. Conversely, the sensor 53 may detect accelerations of the rotatable hub 20 and include the acceleration associated with the typical oscillation of the rotatable hub 20 when the wind turbine 10 is active.

In addition, as shown in FIGS. 3A-3B, other sensors may be provided with the wind turbine 10 to assess the condition or state of the wind turbine 10. In particular, a sensor, such as proximity sensor 54 may be provided in a fixed position within the nacelle 16 and with a reset plate 55 to assist in detecting the revolutions of the rotatable hub 20. More particularly, the proximity sensor 54 may be placed at a fixed location with respect to the drivetrain 50, such as the shroud of the drivetrain, and placed adjacent to the reset plate 55 such that the proximity sensor 54 can detect the passing of the reset plate 55. This detection may be achieved by positioning the proximity sensor 54 at a location that points at the reset plate 55.

Further, the reset plate 55 can be correlated with designated rotor blade 22 for the purpose of estimating an azimuth of the designated rotor blade 22. Thus, when only one reset plate 55 is provided, it can be understood that one detection of the reset plate 55 by the proximity sensor 54 (i.e., a pulse) is acquired, one 360° revolution of the designated rotor blade 22 has occurred. However, it should be understood that any number of proximity sensors 54 and reset plates 55 can be used to assist with detecting the rotation of one or multiple designated rotor blades 22, and thus each 360° revolution of the rotatable hub 20. For example, each detection of the reset plate 55 by the proximity sensor 54 may be defined as a pulse or a reset pulse that can be used by the control system 26 to estimate the azimuth 60 as will be described in greater detail hereinbelow.

Figure 4:
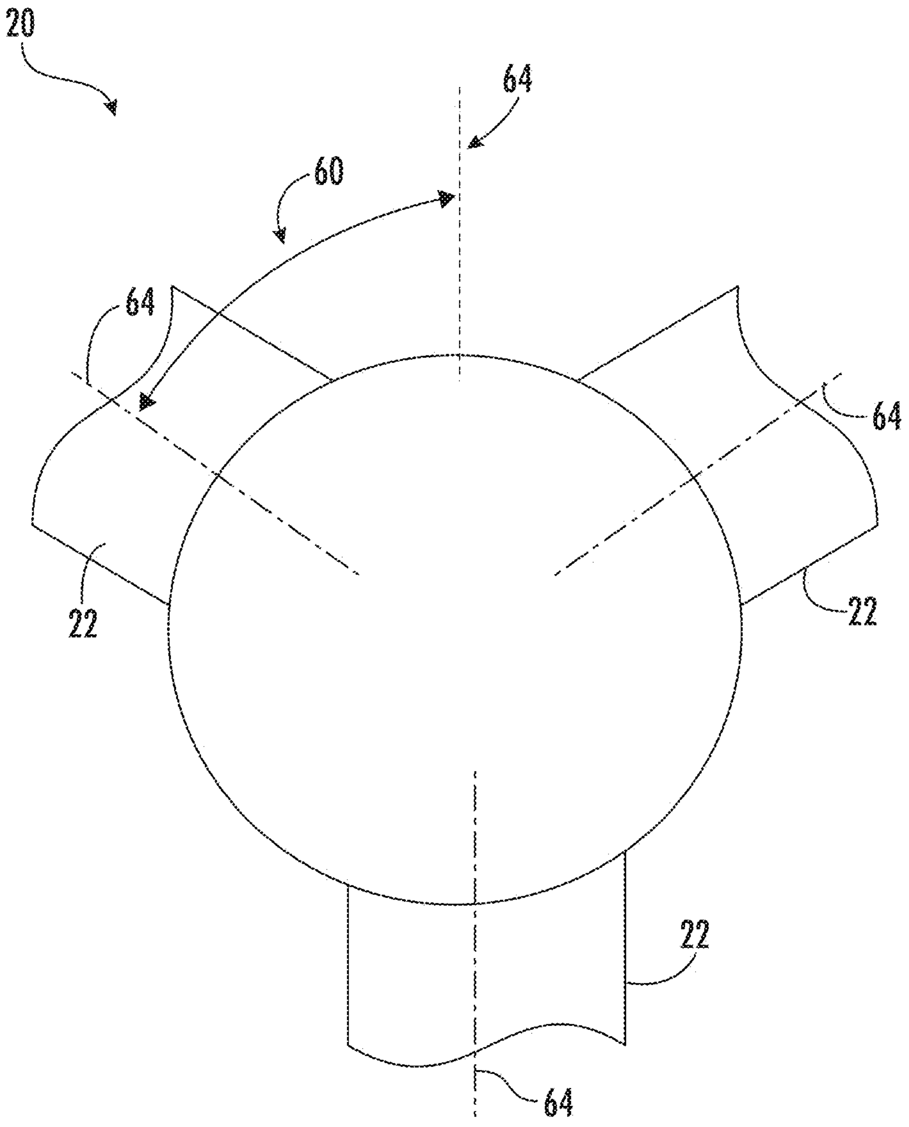
FIG. 4 illustrates a front view of an embodiment of a rotatable hub of a wind turbine according to the present disclosure.

Referring now to FIG. 4, a front view of a rotatable hub is provided according to the present disclosure. As shown, the rotatable hub 20 is depicted with a plurality of rotor blades 22 each of which could be a designated rotor blade 22 that corresponds with a reset plate 55. Thus, continuing with the above example, it can be understood that if only one reset plate 55 is provided, then a pulse from the corresponding proximity sensor is indicative of the designated rotor blade 22 completing a 360° revolution. Further, continuing with the above example, it can be understood that if multiple reset plates 55 are provided, the detection of a single pulse is indicative of a rotation of less than 360° or that multiple reset plates 55 correspond with multiple designated rotor blades 22.

In addition, this relationship between the designated rotor blades 22, the reset plate 55, and the proximity sensor 54 may also be used to estimate the azimuth as referenced above. As presently disclosed, the term "azimuth" refers to an angle between the direction of the rotatable hub 20 and a reference direction. For example, the azimuth 60 may be set within a radial coordinate system having coordinates ranging between 0 and 2 Π (i.e. 0 to 360°). More particularly, the azimuth 60 may be an angle between a direction 64 that a respective rotor blade 22 is facing and a reference direction 64.

Figure 5:
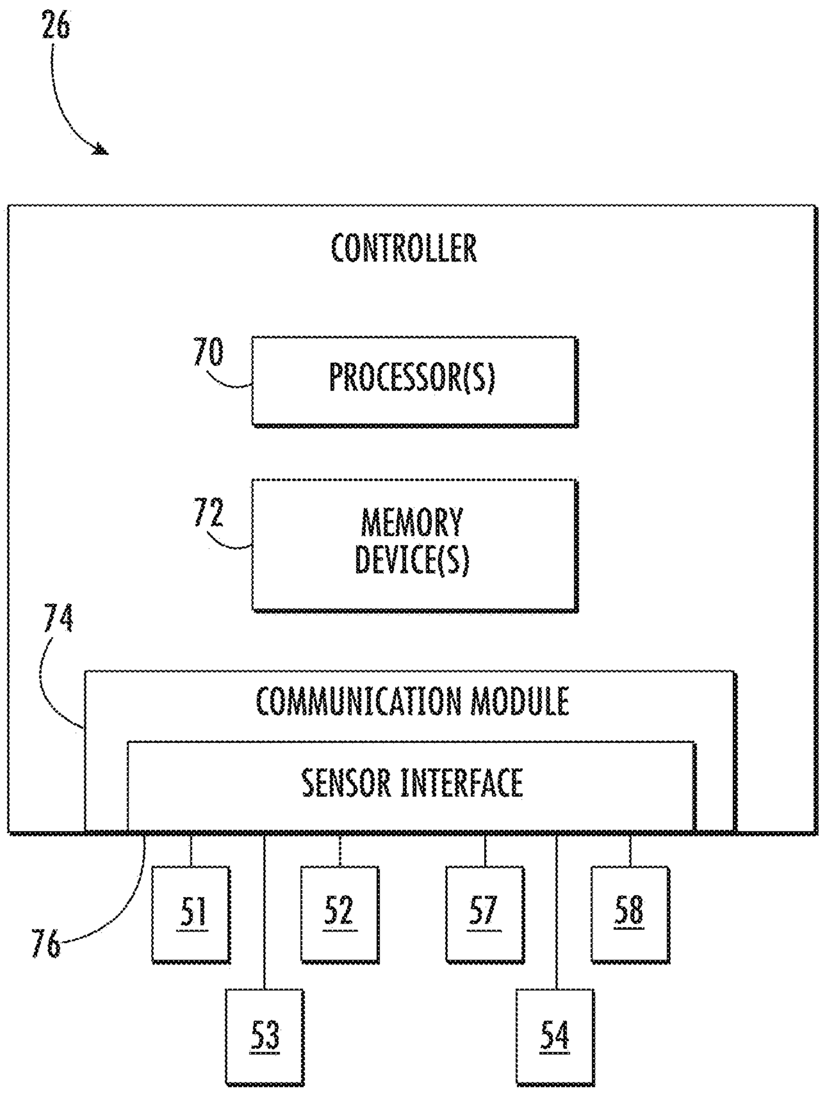
FIG. 5 illustrates a schematic diagram of an embodiment of a controller according to the present disclosure.

Referring now to FIG. 5, a block diagram of an embodiment of suitable components that may be included within the control system 26 according to the present disclosure is illustrated. As shown, the control system 26 may include one or more processor(s) 70 and an associated memory device(s) 72 configured to perform a variety of computer-implemented functions (e.g., performing the methods, steps, calculations, and the like and storing relevant data as disclosed herein).

Additionally, the control system 26 may also include a communications module 74 to facilitate communications between the control system 26 and the various components of the wind turbine 10. Further, the communications module 74 may include a sensor interface 76 (e.g., one or more analog-to-digital converters) to permit signals transmitted from one or more sensors 51, 52, 53, 54, 57, 58 to be converted into signals that can be understood and processed by the processors 70. It should be appreciated that the sensors 51, 52, 53, 54, 57, 58 may be communicatively coupled to the communications module 74 using any suitable means. For example, as shown in FIG. 4, the sensors 51, 52, 53, 54, 57, 58 are coupled to the sensor interface 76 via a wired connection. However, in other embodiments, the sensors 51, 52, 53, 54, 57, 58 may be coupled to the sensor interface 76 via a wireless connection, such as by using any suitable wireless communications protocol known in the art.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 72 may generally comprise memory element(s) including, but not limited to, computer-readable medium (e.g., random access memory (RAM)), computer-readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 72 may generally be configured to store suitable computer-readable instructions that, when implemented by the processor(s) 70, configure the controller(s) 26 to perform various functions including, but not limited to, transmitting suitable control signals to implement corrective action(s) in response to a distance signal exceeding a predetermined threshold as described herein, as well as various other suitable computer-implemented functions.

Figure 6:
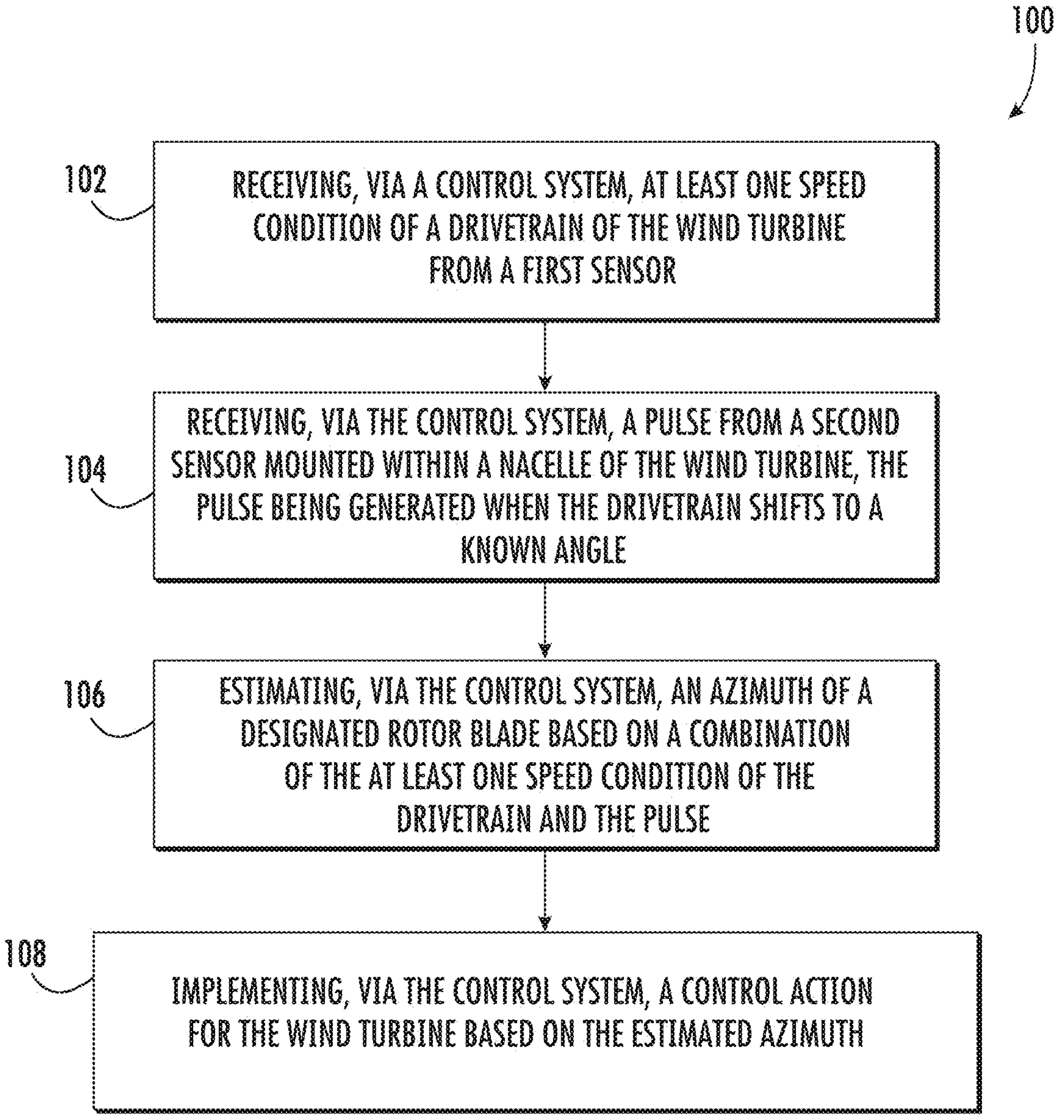
FIG. 6 illustrates a simplified diagram of an embodiment of a method of controlling a wind turbine according to the present disclosure.

Referring now to FIG. 6, a flow diagram of an embodiment of a method 100 for controlling a wind turbine according to the present disclosure is illustrated. The method 100 may be implemented using, for instance, the control system 26 and/or any of the components associated with or contained within the wind turbine 10 discussed above with reference to FIGS. 1-5. FIG. 6 depicts steps performed in a particular order for purposes of illustration and discussion. Those of ordinary skill in the art, using the disclosures provided herein, will understand that various steps of the method 100 or any of the other methods disclosed herein may be adapted, modified, rearranged, performed simultaneously, or modified in numerous ways without deviating from the scope of the present disclosure.

As shown at (102), the method 100 includes receiving, via a control system, at least one speed condition of a drivetrain of the wind turbine from a first sensor. For example, with regard to the wind turbine 10, the control system 26 may receive a speed condition related to the drivetrain 50 from the sensor 52, which may correspond to the first sensor. For example, in an embodiment, the speed condition may be a rotor speed, a generator speed, or combinations or functions thereof.

Further, in an embodiment, the method 100 may include integrating the speed condition with respect to time or passing the speed condition through a Kalman filter to provide an initial value or change of the azimuth. Further, if a Kalman filter is utilized, the Kalman filter may be used to fuse the speed condition with the reset pulse (as discussed in further detail hereinbelow) to provide an initial value or change of the azimuth.

As shown at (104), the method 100 includes receiving, via the control system, a pulse from a second sensor mounted within a nacelle of the wind turbine. For example, in an embodiment, the second sensor may correspond to the proximity sensor 54 and may thus be mounted to point at the reset plate 55 that is secured to the drivetrain 50. Thus, in such embodiments, the control system 26 may receive the pulse when the proximity sensor 54 detects the reset plate 55. In particular, when the drivetrain 50 shifts to a known angle relative to the drivetrain, the proximity sensor 54 will detect the reset plate 55 and register a pulse. This detection may occur as a result of the proximity sensor 54 detecting the surface of the reset plate 55 and/or any other type of distinguishing characteristic (e.g., magnetic or electrical signal) from the reset plate 55.

If multiple sensors 54 are provided, the method 100 may also include detecting multiple pulses (from one or more reset plates 55) and using an acceleration condition of the rotatable hub 20 or the nacelle 16 of the wind turbine 10 to identify the proximity sensor 54. In particular, each individual sensor 54 may be identify using an acceleration condition (or derivative thereof) of the nacelle 16 (via sensor 58) or the rotatable hub 20 (via sensor 53) by correlating the movement of the reset plate 55 with the movement of the nacelle 16 or the rotatable hub 20. More particularly, if there were three detectors one aligned with each blade 22 then the azimuth estimate could be snapped to 0, 120 and 240 degrees as the different pulse signals were received.

As shown at (106), the method 100 includes estimating, via the control system, an azimuth of a designated rotor blade based on a combination of the at least one speed condition of the drivetrain and the pulse. For example, an angle between a designated rotor blade of the wind turbine and the pulse may be computed which could be used to estimate the azimuth. For example, the designated rotor blade 22 may be aligned with a reset plate 55 or the reset plate 55 may be aligned with the designated rotor blade 22 in a position that is the same or different from the reference direction 64. As presently described, aligning the reset plate 55 with the designated rotor blade 22 should be understood to mean orienting the reset plate 55 on the drivetrain 50 at the same angle or a corresponding angle of a designated rotor blade 22. For example, if the designated rotor blade 22 is at an angle of 60°, then the reset plate 55 may be placed on the drivetrain 50 at an angle of 60° or another angle that corresponds with the designated rotor blade 22. However, if the reset plate 55 is aligned with the designated rotor blade 22 by a fixed offset, then the angle the reset plate 55 is placed may be greater or less than the angle of the designated rotor blade 22, i.e., greater or less than 60°.

In any of these configurations, estimating the azimuth may include using a speed condition of the drivetrain 50 to determine the location of the rotor blade 22 that the designated reset plate 55 corresponds to, i.e., the designated rotor blade 22 to which the reset plate 55 is aligned with. As described above, this speed condition of the drivetrain 50 may be observed from the one or more sensors 51, 52 communicatively coupled with the drivetrain 50 and used as an initial value or change of the azimuth. Thus, when a pulse is detected from the proximity sensor 54, the azimuth may be estimated by snapping the initial value for the azimuth to a known value that corresponds to the known angle of the reset plate 55. Further, if multiple proximity sensors 54 or reset plates 55 are provided, then snapping of the azimuth may include snapping the azimuth to the known angle when each of a plurality of pulses corresponding to each reset plate 55 is passed.

If an offset is provided between the designated rotor blade 22 and the reset plate 55, the method 100 may include determining the fixed offset via one or more accelerometers (e.g., sensor(s) 53) mounted in the rotatable hub 20. In further embodiments, the method 100 may include correcting measurements from the accelerometer(s) (e.g., sensor(s) 53) mounted in the rotatable hub 20 via one or more rate gyroscopes (e.g., sensor(s) 57). For example, the correction of the measurements may be achieved by subtracting or removing the measurements from the gyroscope from the measurements of the accelerometer or vice versa. The correction of the measurements may also include averaging the accelerations observed by both the gyroscope and the accelerometer.

Furthermore, the method 100 may also include correcting for an influence of tower side-to-side motions on the drivetrain 50 via one or more accelerometers (e.g., sensor 58) mounted in the nacelle 16 of the wind turbine 10. In such embodiments, the accelerometer(s) are not rotating with the rotor shaft 40 of the wind turbine 10. Thus, the accelerometer(s) may be configured to detect accelerations of the drivetrain 50 independent of the rotation of the rotor shaft 40. Specifically, as described above, the accelerometer(s) are configured to detect accelerations such as tower side-to-side motion due to forces such as gravity acting upon the wind turbine 10. Thus, correcting for an influence of tower side-to-side motions on the drivetrain 50 may include removing the tower side-to-side motions from the calculation of the measurements observed by either sensors 51, 52. For example, removing the side-to-side motions may be accomplished by subtracting or filtering the side-to-side acceleration from the speed condition received by the sensors 51, 52 related to the drivetrain 50. Thus, it can be understood that estimation of the azimuth may be further achieved through the use of a combination of the speed condition of the drivetrain 50, the pulse from the proximity sensor 54, and an acceleration condition of the rotatable hub 20 or the nacelle 16.

As shown at (108), the method 100 includes implementing, via the control system, a control action for the wind turbine 10 when the azimuth varies from an expected azimuth beyond a predetermined threshold. In particular, the control action may include a variety of actions associated with the azimuth. In an embodiment, the control action may be implemented by the pitch adjustment mechanism 32 for each of the rotor blades 22. Thus, in an embodiment, the method 100 may include pitching at least one rotor blade 22 of the wind turbine 10. In another embodiment, the control action may be implemented by the drivetrain 50 and may include uprating or derating the wind turbine 10.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for controlling a wind turbine, the method comprising:

receiving, via a control system, at least one speed condition of a drivetrain of the wind turbine from a first sensor;

receiving, via the control system, a pulse from a second sensor mounted within a nacelle of the wind turbine, the second sensor further being mounted with a reset plate that is secured to the drivetrain, the pulse being generated when the drivetrain shifts to a known angle, wherein, when the drivetrain shifts to the known angle, the second sensor detects the reset plate and registers the pulse to detect revolutions of a rotatable hub of the wind turbine;

estimating, via the control system, an azimuth of a designated rotor blade based on a combination of the at least one speed condition of the drivetrain and the pulse by snapping the azimuth to the known angle when the pulse is generated corresponding to the reset plate being passed; and implementing, via the control system, a control action for the wind turbine based on the estimated azimuth.

2. The method of claim 1, wherein the at least one speed condition of the drivetrain comprises at least one of a generator speed or a rotor speed of the wind turbine.

3. The method of claim 2, wherein estimating the azimuth of the designated rotor blade based on the combination of the at least one speed condition of the drivetrain and the pulse further comprises integrating the at least one speed condition of the drivetrain with respect to time or passing the at least one speed condition of the drivetrain and the pulse through a Kalman filter.

4. The method of claim 1, further comprising directly aligning the reset plate with the designated rotor blade.

5. The method of claim 1, wherein the second sensor comprises a plurality of second sensors and the pulse comprises a plurality of pulses, wherein the method further comprises:

identifying each second sensor of the plurality of second sensors using at least one acceleration condition of the rotatable hub or the nacelle of the wind turbine; and snapping the azimuth to the known angle when each of the plurality of pulses is passed from the plurality of second sensors.

6. The method of claim 1, further comprising correcting for an influence of tower side-to-side motions on the drivetrain via one or more accelerometers mounted in the nacelle of the wind turbine, the one or more accelerometers not rotating with a main shaft of the wind turbine.

7. The method of claim 1, wherein the control action is implemented via at least one of the drivetrain or a pitch adjustment mechanism, wherein the control action comprises at least adjusting a rating of the wind turbine or pitching at least one rotor blade of the wind turbine.

8. A system for controlling a wind turbine, the system comprising:

a first sensor communicatively coupled to a drivetrain of the wind turbine;

a second sensor mounted within a nacelle of the wind turbine, the second sensor further being mounted with a reset plate that is secured to the drivetrain; and a control system, the control system configured to:

receive at least one speed condition of the drivetrain from the first sensor;

receive a pulse from the second sensor, the pulse being generated when the drivetrain shifts to a known angle, wherein, when the drivetrain shifts to the known angle, the second sensor detects the reset plate and registers the pulse to detect revolutions of a rotatable hub of the wind turbine;

estimate an azimuth of a designated rotor blade based on a combination of the at least one speed condition of the drivetrain and the pulse by snapping the azimuth to the known angle when the pulse is generated corresponding to the reset plate being passed; and implement, via the control system, a control action for the wind turbine based on the estimated azimuth.

9. The system of claim 8, wherein the at least one speed condition of the drivetrain comprises at least one of a generator speed or a rotor speed of the wind turbine, wherein estimating the azimuth of the designated rotor blade based on the combination of the at least one speed condition of the drivetrain and the pulse further comprises integrating the at least one speed condition of the drivetrain with respect to time or passing the at least one speed condition of the drivetrain and the pulse through a Kalman filter.

10. The system of claim 8, wherein the reset plate is directly aligned with the designated rotor blade.

* * * * *